Aug. 9, 1938.    K. M. BYRON    2,126,090
TRAILER BODY FRAME
Original Filed Oct. 4, 1934
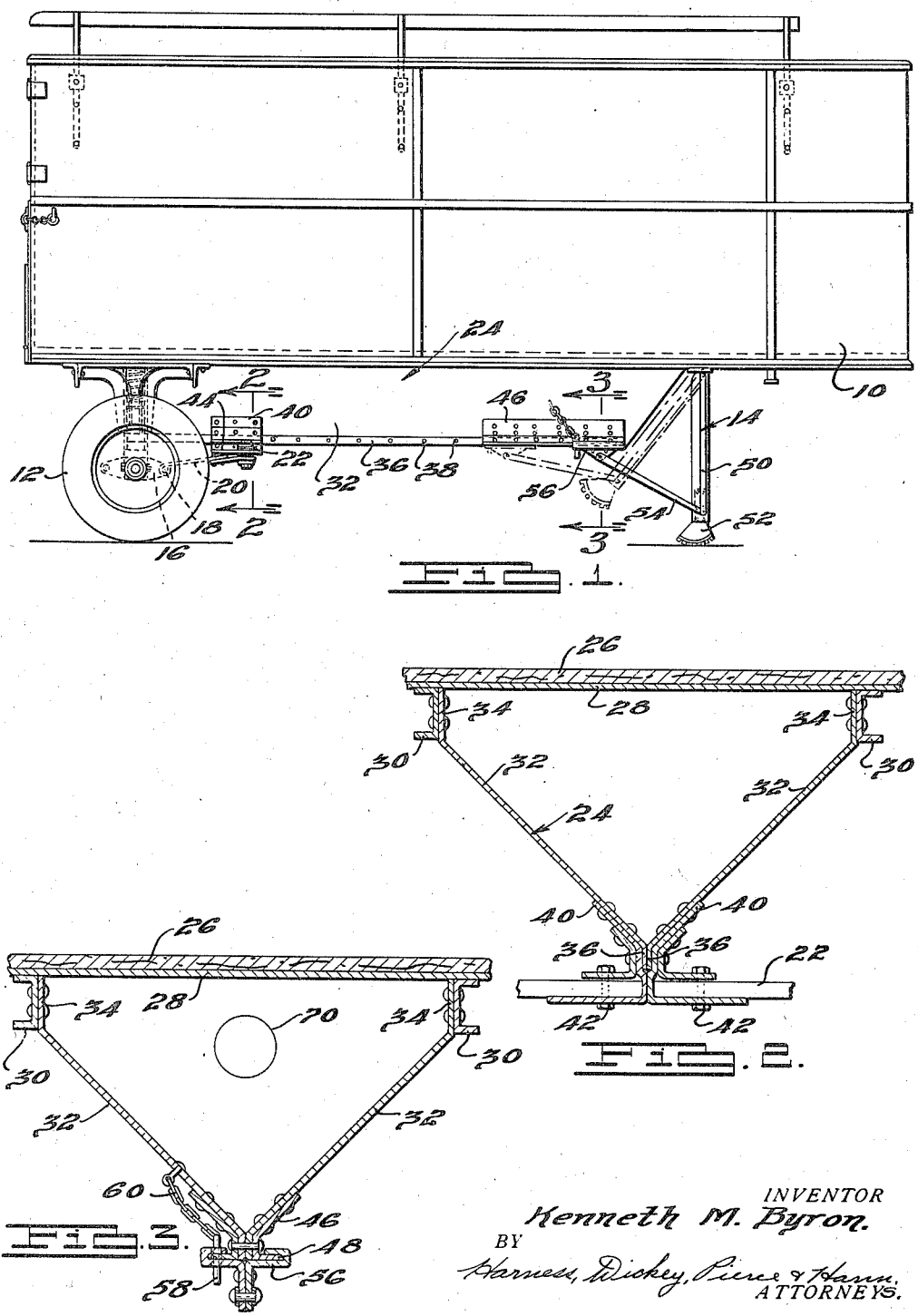
INVENTOR
Kenneth M. Byron.

Patented Aug. 9, 1938

2,126,090

UNITED STATES PATENT OFFICE 2,126,090

TRAILER BODY FRAME

Kenneth M. Byron, Detroit, Mich.

Original application October 4, 1934, Serial No. 746,818. Divided and this application June 4, 1936, Serial No. 83,418

4 Claims. (Cl. 280—106)

This invention relates to vehicles and in particular relates to a frame supporting structure for trailers.

The present application is a division of co-pending application Serial No. 746,818, filed October 4, 1934.

Objects of the present invention are to provide in vehicles a rigid frame supporting structure of materially less weight than in prior constructions; to provide a frame supporting structure of relatively simple and economical construction having few and easily fabricated elements; to provide a vehicle frame structure which is materially reinforced and strengthened by a V-shaped bracing element extending substantially the length of the vehicle to prevent it from sagging and forming a transversely closed housing, and to provide a frame structure having a pivoted landing gear associated therewith of such a construction that the landing gear supports the forward portion of the vehicle when the power unit is removed and is moved to an out-of-the-way position when the vehicle is connected to the power unit.

Other objects of the invention will become apparent from the following specification, the drawing relating thereto, and from the claims hereinafter set forth.

In the drawing, in which like numerals are used to designate like parts in the several views throughout:

Figure 1 is a side view in elevation of a trailer embodying features of the invention;

Figure 2 is an enlarged sectional view of the structure illustrated in Figure 1, taken along the line 2—2 thereof; and Figure 3 is an enlarged sectional view of the structure illustrated in Figure 1, taken along the line 3—3 thereof.

In general, according to Figure 1, a trailer body 10 is provided having wheels 12 at its rear end and a landing gear 14 at its front end. A power unit may be attached to the front end of the trailer, and through the forward movement of the trailer, the landing gear 14 will be released to have the front end of the trailer supported on the car unit with the load divided therebetween and the wheels 12 at the rear end of the unit.

As is more fully described in the parent application above referred to, two pairs of wheels 12 are employed at the sides of the rear end of the vehicle in aligned relation, and are interconnected to permit adjustment of the wheels relative to each other and to the trailer. Each pair of wheels is mounted on trunnion axles which support frames 16 having side elements interconnected by rods 18. The front rods 18 have plates 20 pivotally mounted thereon and universally and adjustably mounted at their forward ends to a cross rod 22. The cross rod interconnects the pairs of wheels and provides a means not only for holding the wheels in aligned position, but also for turning both pairs together under certain circumstances where the trailer has to be turned sharply. The rod 22 is supported centrally by a V-shaped element 24 in a manner to be later described in further detail.

The trailer body has a floor 26 with a rust-proof plate 28 on the outer side thereof and is preferably built up on a plurality of longitudinally extending channel elements 30, extending substantially the length of the body, the central pair of which are riveted to the V-shaped reinforcing element 24 for the purpose of adding longitudinal strength to the chassis construction.

The reinforcing or supporting element 24 comprises plates 32, which have vertically disposed upper edges 34 riveted along the lengths thereof to the channel members 30. The plates 32 are angularly disposed to each other below the channel members 30 extending toward each other to mate centrally of the body and are provided with downwardly extending flange portions 36 joined together along their length by a plurality of rivets 38. These flanges additionally stiffen the reinforcing element 24 along its length and increase the bending resistance of the comparatively light weight reinforcing element 24 to prevent sagging of the vehicle body.

The V-shaped reinforcing or supporting element 24 extends substantially the length of the body, and it is evident that the plate members making up the supporting element in the manner described provide a simplified construction of materially less weight than provided in known constructions and that a rigid support is provided which prevents sagging of the vehicle body.

For supporting the rod 22, a pair of angle bracket plates 40 are secured to the reinforcing element 24 at each side of its apex portion; and for securing the rod 22 in position, bolts 42 pass through the horizontal leg portions of the brackets and through openings in the rod. As shown in Figure 1, the rod passes laterally through a slot 44 formed in the vertical web portions of the bracket plates 40, and this slot is of such length longitudinally of the trailer that considerable forward and backward movement of the rod in the slot may occur when the bolts are removed.

The bracket plates 40 also assist in stiffening the supporting element 24.

At the front end of the reinforcing element 24, additional strength is provided by plates 46 which are riveted to the mated flanges of the plates 32 and to the sloping sides of the plates and which have laterally extending flanges 48 for the purpose of forming a track for positioning the landing gear 14.

The landing gearing 14 has a downwardly extending arm 50 with a foot 52 thereon, which contacts the road and supports the front end of the trailer on the arm 50. A pair of links 54 interconnect the lower end of the arm 50 with a sliding shoe 56. The links 54 are pivoted to the shoe 56 which is extended around the flange 48 in a position to slide therealong. Suitable means are provided for locking the shoe on the flanges 48 in the forward and rear positions, as in the form of a pin 58 attached to a chain 60. In this manner, the landing gear 14 is locked in raised position during the movement of the trailer and in load supporting position to prevent the movement of the trailer after the power unit is moved therefrom.

The supporting element 24 forms a transversely closed housing extending longitudinally of the body for substantially its length, and is advantageous in enclosing other operating elements of the vehicle, such as a power brake mechanism 70, which is used to operate brakes on the wheels. Such mechanisms mounted within the housing 24 would be protected from damage from obstacles and kept clean from dirt and grime thrown up from the road.

Formal changes may be made in the specific embodiment of the invention described without departing from the spirit and substance of the broad invention, the scope of which is commensurate with the appended claims.

What is claimed is:

1. In a vehicle, a framework comprising a floor section, and a V-shaped laterally closed housing connected to the under side of said floor section forming therewith a closed box section extending longitudinally thereof for substantially the length of the floor section.

2. In a vehicle, a framework comprising a floor section, a pair of plate elements connected to the under side of said floor section, said plate elements being laterally spaced on each side of the longitudinal center line of said floor section at the lines of connection with said floor section, converging toward each other, and being joined together at substantially the center of the floor section, forming with the floor section a closed box section extending substantially the length of the floor section.

3. In a vehicle, a framework comprising a floor section, a pair of elongated plate members connected to the under side of said floor section along lines laterally spaced from the longitudinal center line of said floor section, said plate elements extending downwardly toward each other and terminating in downwardly directed flanges, and said flanges being connected together along their lengths, forming with the floor section a closed box section extending substantially the length of the floor section.

4. In a vehicle a framework having a pair of spaced center rails disposed longitudinally, an elongated plate element connected to each one of said rails, said plate elements extending downwardly toward each other and terminating in downwardly directed flanges, said flanges being connected together along their lengths, forming a laterally closed housing extending substantially the length of the vehicle.

KENNETH M. BYRON.